United States Patent [19]
Wingard et al.

[11] Patent Number: 5,948,089
[45] Date of Patent: Sep. 7, 1999

[54] FULLY-PIPELINED FIXED-LATENCY COMMUNICATIONS SYSTEM WITH A REAL TIME DYNAMIC BANDWIDTH ALLOCATION

[75] Inventors: Drew Eric Wingard, San Carlos; Geert Paul Rosseel, Menlo Park, both of Calif.

[73] Assignee: Sonics, Inc., Los Altos, Calif.

[21] Appl. No.: 08/924,368

[22] Filed: Sep. 5, 1997

[51] Int. Cl.⁶ .................................................. G06F 13/00
[52] U.S. Cl. ...................... 710/107; 709/251; 710/111; 710/104
[58] Field of Search ............................ 395/200.81, 287, 395/291, 284, 200.5, 200.52; 709/220, 222, 251; 710/104, 111, 107, 129

[56] References Cited

U.S. PATENT DOCUMENTS

| | | | |
|---|---|---|---|
| 4,979,096 | 12/1990 | Ueda et al. | 395/200.78 |
| 5,414,813 | 5/1995 | Shiobara | 395/200.75 |
| 5,465,330 | 11/1995 | Komatsu et al. | 395/824 |
| 5,553,245 | 9/1996 | Su et al. | 395/284 |
| 5,701,420 | 12/1997 | Nedwek et al. | 395/284 |
| 5,727,169 | 3/1998 | Calzi | 395/284 |

*Primary Examiner*—Glenn A. Auve
*Attorney, Agent, or Firm*—Blakely, Sokoloff, Taylor & Zafman LLP

[57] ABSTRACT

The present invention provides for an on-chip communications method with fully distributed control combining a fully-pipelined, fixed-latency, synchronous bus with a two-level arbitration scheme where the first level of arbitration is a framed, time-division-multiplexing arbitration scheme and the second level is a fairly-allocated round-robin scheme implemented using a token-passing mechanism. Both the latency and the bandwidth allocation are software programmable in real-time operation of the system. The present invention also provides for a communications system where access to a shared resource is controlled by the above communications protocol. Access to and from the shared resource from the subsystem is through a bus interface module. The bus interface modules provide a level of indirection between the subsystem to be connected and the shared resource. This allows the decoupling of system performance requirements from subsystem requirements. Communication over the bus is fully memory mapped.

38 Claims, 12 Drawing Sheets

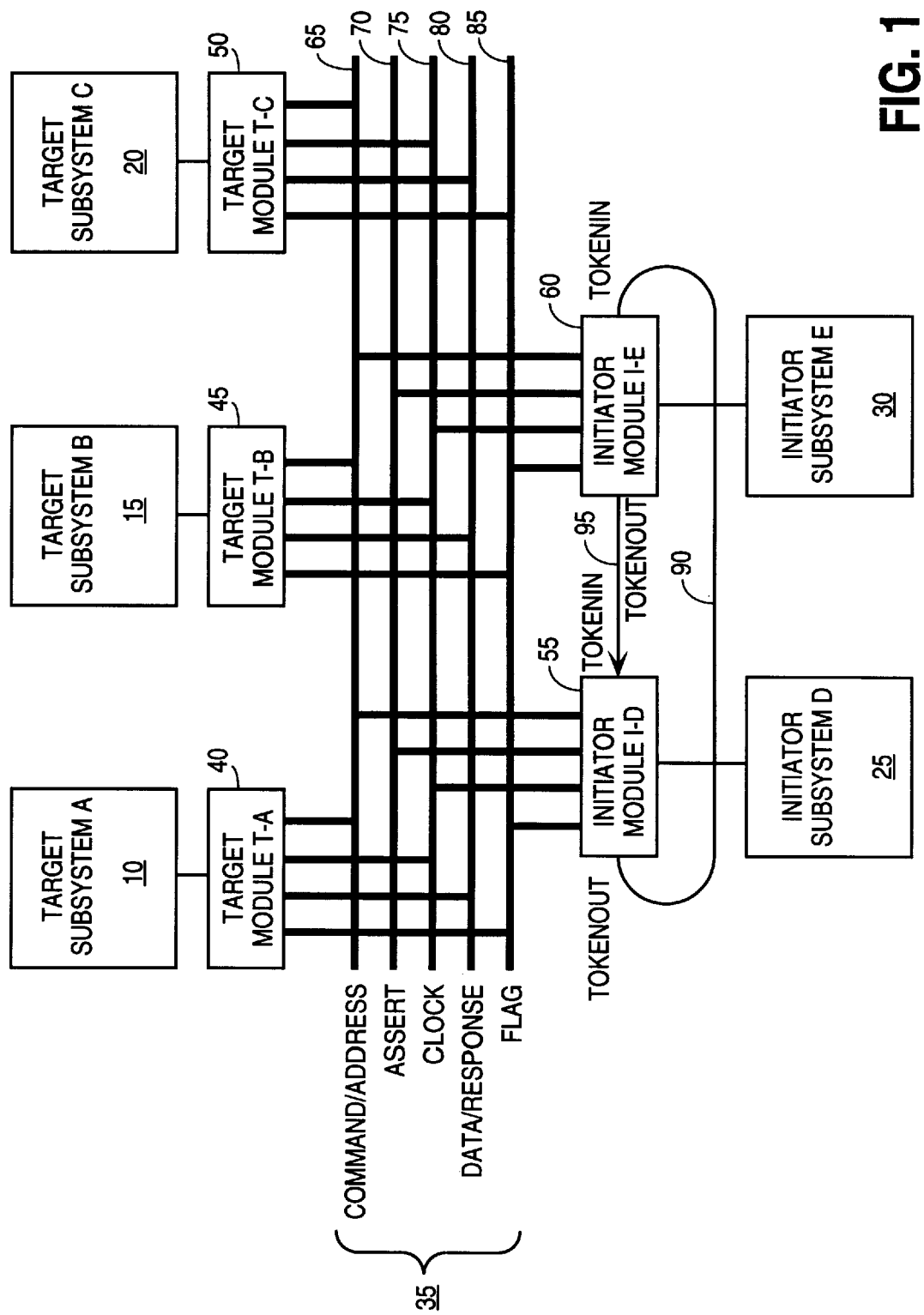

| SIGNAL NAME | CYCLE | WIDTH | FUNCTION |
|---|---|---|---|
| SBASSERT | S0 | 1 | SLICE OWNER ASSERTS IT WILL USE THE SLOT (INITIATOR ONLY) |
| SBTOKENIN | S0 | 1 | ROUND-ROBIN TOKEN GRANT IN (INITIATOR ONLY) |
| SBTOKENOUT | S0 | 1 | ROUND-ROBIN TOKEN GRANT OUT (INITIATOR ONLY) |
| SBADDR | S1 | 32 | TRANSACTION ADDRESS |
| SBCMD | S1 | 3 | TRANSACTION TYPE |
| SBWIDTH | S1 | 2 | TRANSACTION WIDTH |
| SBDATA | SM | 64 | READ/WRITE DATA |
| SBRESP | SM | 3 | TRANSACTION RESPONSE |
| SBFLAGNUM | SM | 6 | RETRY FLAG NUMBER |
| SBERROR | SM | 1 | BACKPLANE ERROR |
| SBFLAG | NA | ≤32 | DEVICE EVENT FLAGS |
| SBRESET | NA | 1 | BACKPLANE RESET |
| SBCLOCK | NA | 1 | SILICON BACKPLANE MASTER CLOCK |

FIG. 2B

| SBCMD[2] | SBCMD[1] | SBCMD[0] | TRANSACTION TYPE |
|---|---|---|---|
| 0 | 0 | 0 | IDLE |
| 0 | 0 | 1 | WRITE |
| 0 | 1 | 0 | READ |
| 1 | 1 | 1 | BROADCAST |

FIG. 2C

| SBRESP[1] | SBRESP[0] | |
|---|---|---|
| 0 | 0 | NO REPSONSE (NULL) |
| 0 | 1 | DATA VALID/ACCEPTED (DVA) |
| 1 | 0 | RETRY (RTRY OR RTRYFLG) |
| 1 | 1 | BUSY (BUSY) |

FIG. 2D

| SIGNAL NAME | WIDTH | FUNCTION |
|---|---|---|
| TPTMADDR | ≤32 | TRANSACTION ADDRESS |
| TPTMCMD | 3 | TRANSACTION TYPE |
| TPTMCMDVALID | 1 | COMMAND VALID |
| TPTMBURST | 3 | BURST TYPE |
| TPTMWIDTH | 2 | DATA WIDTH |
| TPTCDATAIN | ≤64 | READ DATA |
| TPTMDATAOUT | ≤64 | WRITE DATA |
| TPTMDATAVALID | 1 | WRITE DATA VALID |
| TPTCREADY | 1 | CLIENT AVAILABLE |
| TPTCRESP | 2 | TARGET CLIENT RESPONSE |
| TPTCINTERRUPT | 1 | TARGET CLIENT INTERRUPT |
| TPTMRESET | 1 | TARGET CLIENT RESET |
| TPCLK | 1 | TARGET CLIENT CLOCK |

FIG. 2E

| TPTMCMD[2] | TPTMCMD[1] | TPTMCMD[0] | TRANSACTION TYPE |
|---|---|---|---|
| 0 | 0 | 0 | IDLE |
| 0 | 0 | 1 | WRITE |
| 0 | 1 | 0 | READ |

FIG. 2F

| SIGNAL NAME | WIDTH | FUNCTION |
|---|---|---|
| IPIMVALID | 1 | IM READY TO ACCEPT DATA |
| IPICVALID | 1 | IC REQUEST VALID |
| IPICADDR | 32 | IC TRANSACTION ADDRESS |
| IPICCMD | 3 | IC TRANSACTION TYPE |
| IPICBURST | 3 | IC BURST MODE |
| IPICWIDTH | 2 | IC DATA TRANSACTION WIDTH |
| IPICRESP | 2 | IM TRANSACTION RESPONSE |
| IPICDATA | ≤64 | WRITE DATA FROM CLIENT TO MODULE |
| IPIMDATA | ≤64 | READ DATA FROM MODULE TO CLIENT |
| IPTMCMD | 3 | TM TRANSACTION TYPE |
| IPTMADDR | ≤32 | TM TRANSACTION ADDRESS |
| IPTMBURST | 3 | TM BURST MODE |
| IPTMWIDTH | 2 | TM DATA TRANSACTION WIDTH |
| IPTCREADY | 1 | TC READY SIGNAL |
| IPTCINTERRUPT | 1 | TC INTERRUPT SIGNAL |
| IPTCRESP | 2 | TC TRANSACTION RESPONSE |
| IPTMDATA | ≤64 | WRITE DATA FROM MODULE TO CLIENT |
| IPTCDATA | ≤64 | READ DATA FROM CLIENT TO MODULE |
| IPRESET | 1 | INITIATOR CLIENT RESET |
| IPCLK | 1 | INITIATOR CLIENT CLOCK |

FIG. 2G

| IPICCMD[2] | IPICCMD[1] | IPICCMD[0] | TRANSACTION TYPE |
| --- | --- | --- | --- |
| 0 | 0 | 0 | IDLE |
| 0 | 0 | 1 | WRITEUNORD |
| 0 | 1 | 0 | READUNORD |
| 0 | 1 | 1 | READEX |
| 1 | 0 | 0 | READORD |
| 1 | 0 | 1 | WRITEORD |
| 1 | 1 | 0 | READPRE |
| 1 | 1 | 1 | BROADCAST |

| CURRENT STATE | INPUTS | | | | | OUTPUTS | | |
|---|---|---|---|---|---|---|---|---|
| | REQTOKEN | TOKENIN | ASSERT | RESET_N | FIRST | TOKENOUT | GRANT TOKEN | NEXT STATE |
| NOTOKEN | 0 | X | X | 0 | X | TOKENIN | 0 | NOTOKEN |
| NOTOKEN | 1 | X | X | 0 | X | TOKENIN | 0 | WANTTOKEN |
| WANTTOKEN | 0 | 0 | X | 0 | X | 0 | 0 | NOTOKEN |
| WANTTOKEN | 1 | 0 | X | 0 | X | 0 | 0 | WANTTOKEN |
| WANTTOKEN | X | 1 | 0 | 0 | X | 0 | 1 | GENTOKEN |
| WANTTOKEN | 0 | 1 | 1 | 0 | X | 0 | 0 | GENTOKEN |
| WANTTOKEN | 1 | 1 | 1 | 0 | X | 0 | 0 | HAVETOKEN |
| HAVETOKEN | X | X(0*) | 0 | 0 | X | 0 | 1 | GENTOKEN |
| HAVETOKEN | 0 | X(0*) | 1 | 0 | X | 0 | 0 | GENTOKEN |
| HAVETOKEN | 1 | X(0*) | 1 | 0 | X | 0 | 0 | HAVETOKEN |
| GENTOKEN | 0 | 0 | X | 0 | X | 1 | 0 | NOTOKEN |
| GENTOKEN | 1 | 0 | X | 0 | X | 1 | 0 | WANTTOKEN |
| GENTOKEN | X | 1 | 0 | 0 | X | 1 | 1 | GENTOKEN |
| GENTOKEN | 0 | 1 | 1 | 0 | X | 1 | 0 | GENTOKEN |
| GENTOKEN | 1 | 1 | 1 | 0 | X | 1 | 0 | HAVETOKEN |
| X | X | X | X | 1 | 0 | 0 | 0 | NOTOKEN |
| X | X | X | X | 1 | 1 | 0 | 0 | GENTOKEN |

| 1 | 2 | 3 | 4 | 5 |
|---|---|---|---|---|
| ARBITRATION 1 PRE-ALLOCATED TO I-D | ARBITRATION 2 TOKEN USED BY I-E | | | |
| | COMMAND 1 I-D | COMMAND 2 I-E | | |
| | ADDRESS 1 I-D | ADDRESS 2 I-E | | |
| | | | DATA 1 I-D | DATA 2 I-E |
| | | | RESPONSE 1 I-D | RESPONSE 2 I-E |

FIG. 5

FULLY-PIPELINED FIXED-LATENCY COMMUNICATIONS SYSTEM WITH A REAL TIME DYNAMIC BANDWIDTH ALLOCATION

BACKGROUND OF THE INVENTION

1. Field of the Invention

The present invention relates to a bus system to couple computing devices.

2. Art Background

As electronic computing and communications systems continue to increase in features and complexity, and to shrink in physical size and cost per function, more and more constraints are placed on the system designer. The demand for such systems is focused in high-volume, cost-sensitive markets such as consumer electronics, where rapid time-to-market is a business necessity. The only feasible approach to deliver more complex systems in less time and at lower prices is to make effective use of advanced integrated circuit technology, push functionality into software, and migrate subsystem components from one design into subsequent designs.

Re-use of subsystem components in subsequent designs have become quite common. Many other benefits are realized in addition to the time savings achieved. First, a model may be written for the proven subsystem that can provide accurate results when analyzing the requirements and performance of a new system design; the model for a new, unproven subsystem is likely to be neither as accurate as the proven subsystem, nor built in time to influence the design. Second, proven subsystems can serve as building blocks that simplify the overall design process by allowing the system designer to focus at a higher level of abstraction, while providing improved predictability in the resulting system implementation. Third, re-use of hardware subsystems protects the investment in software to control those subsystems, and allows the system software implementation to proceed as soon as the hardware building blocks have been chosen. Finally, subsystem re-use protects the investment in verification and testing. Since the desired systems are highly integrated, the required subsystems end up deeply embedded within an integrated circuit. In deeply-embedded designs, verifying the design functionality becomes very challenging and testing an individual system to prove that it is correctly built can lead to expensive delays or costly system rework. Thus, maintenance of the integrity of subsystem verification and test is likely the single biggest gain from design re-use.

Traditional approaches to design re-use have various strengths and weaknesses. An essential aspect of such approaches is the communications interface the various subsystems present to one another. One approach is to define customized point-to-point interfaces between a subsystem and each peer to which it must communicate. This interface style is particularly popular in applications where data flows from a first subsystem into the subsystem being designed, which processes the data and outputs the data to a second subsystem. This customized approach offers protocol simplicity, guaranteed performance, and isolation from dependencies on unrelated subsystems. However, customized interfaces by their very nature are inflexible. If a new application needs an existing subsystem to be interfaced to one that does not share its interface, design re-work is required. If the application requires the subsystem to communicate with different subsystems, multiple copies of subsystems or interfaces may be required, leading to system inefficiencies. Furthermore, if an updated algorithm is to be implemented in the subsystem, the new algorithm will need to be wedged into the old customized interfaces to allow communication with existing peer subsystems.

A second approach is to define a system using standardized interfaces. It is common to see standardized interfaces paired with various forms of shared interconnect to form a communications subsystem. Many standardized interfaces are based on pre-established computer bus protocols. One significant advantage to this approach is flexibility in communications patterns: the ability for every agent to communicate with every other agent in the system. Computer buses allow flexibility in system design, since as many different agents may be connected together as required by the system, as long as the bus has sufficient performance. A final advantage is the natural mapping of address/data transfers, which are fundamental to processor-memory communications, into systems where complex algorithms that are implemented in software need to communicate with hardware subsystems. Along with shared interconnect comes a requirement to allocate the communications resources among the various initiator devices and target subsystems. In the case of computer buses, resource allocation is typically referred to as arbitration.

A principal disadvantage of standardized bus interfaces is the uncertainty in transfer delay (normally called latency) that results from arbitration. Latency uncertainty causes trouble for subsystems that must satisfy real-time constraints, since data that does not arrive in time to meet a deadline can result in improper system behavior. A second disadvantage is a lack of total available transfer opportunities (normally called bandwidth) that results from the computer system heritage. Historically, as well as presently, a bus typically is designed to support the peak transfer rate of the processor connected to it, and transfer opportunities not claimed by the processor are made available to other agents. Systems with combined bandwidths in excess of the peak processor bandwidth therefore must resort to multilevel bus schemes, or a mix of buses and dedicated connections, to separate the bandwidth. A final disadvantage is the inability to effectively support communication that does not map easily into address/data transfers (for instance, handshaking signals between two agents) or communications originated by an agent that is not an initiator (for instance, an interrupt signal driven by a target subsystem to signal an initiator device that data is available).

In summary, existing communication approaches do not meet the requirements for effective design re-use. What is needed is a new structure that allows maximum subsystem re-use in systems that span a wide range of performance characteristics. If a computer bus could be extended to remove its performance and communications style limitations, it might well serve as the basis for many highly integrated systems.

Furthermore, subsystem communications requirements vary greatly. Some subsystems, such as input/output devices like keyboards, infrared remote controllers, and LED displays, have very low bandwidth requirements and are very tolerant of variable latency. Other subsystems, such as a RISC CPU or a digital signal processor, desire high available bandwidth and low latency to memory, but can tolerate bandwidth limits and variable latency at the expense of slower program execution. Still other subsystems, such as a T1 telephony link or an SVGA display, have moderate to high bandwidth requirements, but cannot tolerate uncertainties in bandwidth nor latency. Such real-time subsystems need guaranteed bandwidth and latency, and there is no advantage to providing any extra performance.

Therefore, it is desirable that such a communication mechanism would allow subsystems of widely varying performance characteristics to interoperate, and greatly improve the re-use of the subsystems by providing a standardized interface. However, this does not address the issue that the operating frequency of the communication mechanism must be variable to support the required bandwidth of the system under design. If a standardized interface is at the communication interface, changing frequencies of the communication interface requires changing the operating frequencies of the subsystems. Increasing the frequency of a subsystem beyond its requirements wastes power, can lead to algorithmic problems (some subsystems need to operate at fixed frequencies), and can prevent design re-use altogether when the new frequency is higher than the previously-designed subsystem can operate. What is needed is a method to de-couple the frequency of the communication interface from the operating frequencies of the various client subsystems, so that each may operate based on their own requirements.

SUMMARY OF THE INVENTION

This invention streamlines the design of very complex systems by providing highly-predictable communications capabilities that allow higher degrees of design re-use, simpler performance analysis, flexible communications capabilities, and shorter design times.

In one embodiment, the single chip computer bus system includes at least one initiator device and at least one target subsystem. The bus cycles are divided up into recurring frames. At least one initiator device is pre-allocated certain request frames to transmit a request and a certain reply frame a predetermined number of clock cycles after the request frame. When a request is to be issued, the initiator device issues the request during the pre-allocated frame. The requests contain an address identifying the target subsystem and a command indicating the action to be taken by the target. Each target subsystem coupled to the bus monitors the request packets issued and responds to those request packets containing the address that corresponds to the target subsystem address. The target responds by performing the command noted in the packet and transmitting a response packet the predetermined number of clock cycles after the request packet was issued.

Preferably, this is implemented in a system that unifies communication between subsystems having widely varying constraints. For example, in one embodiment, cycles are pre-allocated to initiators with high bandwidth and low latency requirements. The remaining initiators arbitrate for available frames, such as on a round-robin basis.

BRIEF DESCRIPTION OF THE DRAWINGS

The objects, features and advantages of the present invention will be apparent from the following detailed description in which:

FIG. 1 illustrates one embodiment of a single chip communication system that operates in accordance with the teachings of the present invention.

FIGS. 2b, 2c, 2d, 2e, 2f, 2g, 2h describe signals into and out of the interface module of FIG. 2a.

FIGS. 4a and 4b illustrate one embodiment of the arbitration states for the second level of arbitration.

FIG. 5 is an illustrative timing diagram showing bus transactions in accordance with the teachings of the present invention.

DETAILED DESCRIPTION

Figure 2A:
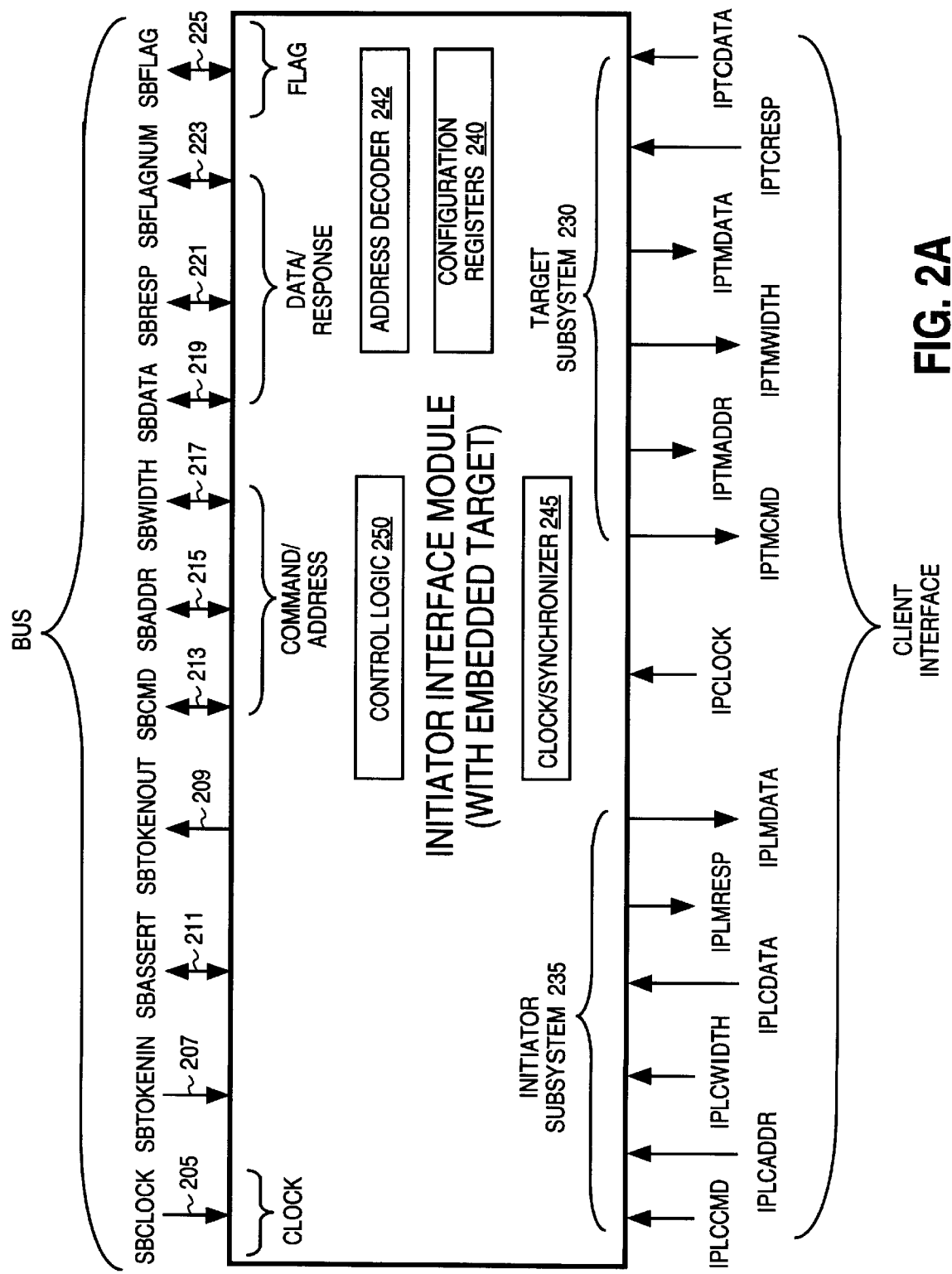
FIG. 2a illustrates a simplified block diagram of one embodiment of an initiator interface module.

The present invention provides an innovative communications protocol and bus structure on a single semiconductor device to support different subsystems having different timing constraints. In particular, as will be described below, the system and method of the present invention provides an efficient mechanism for providing a high bandwidth and low latency communications path between two or more subsystems as well as provides an efficient mechanism for providing a minimum guaranteed bandwidth to any subsystem that needs real-time performance. Furthermore, the system and method of the present invention provides an efficient mechanism for decoupling the requirements of the subsystems from the system level requirements. This enables coupled subsystems to be re-used in systems with widely varying system latency and bandwidth requirements without modification of the subsystem. In addition, the system and method of the present invention provides an efficient mechanism to implement address/data-style memory mapped communication, dedicated point-to-point communication, and one-to-many broadcast-style communication. The proposed communications method governs the communication between different subsystems that are part of a larger system and that are communicating to each other through a shared communication bus. The system can consist of one or more integrated circuits or chips, and a subsystem can be a logic block on an integrated circuit containing many logic blocks or an integrated circuit implementing a single logic function.

FIG. 1 shows one embodiment of a system that operates in accordance with the teachings of the present invention. The system is coupled to three target subsystems 10, 15 and 20 and two initiator subsystems 25, 30 communicating to each other over the communications bus 35. A target subsystem 10, 15, 20 is defined herein as a subsystem that can only receive and respond to requests. Typical target subsystems are memory subsystems and input/output (I/O) devices. An initiator subsystem 25, 30 is a subsystem that can receive and respond to requests, and can also issue requests. Typical initiator subsystems are central processing unit (CPU) cores, digital signal processor (DSP) cores direct memory access (DMA) engines, co-processors, etc. In one embodiment, an interface unit 40, 45, 50, 55, 60 is connected between each subsystem 10, 15, 20, 25, 30 and the bus 35. These interface modules 40, 45, 50, 55, 60 contain logic which issues and/or replies to packets in accordance with the bus protocol. In addition, as will be explained below, it is preferred that the interface synchronizes the subsystem and bus clocks for efficient data transfer. Finally, in the present invention, there is no need for a dedicated controller unit to manage the transactions over the communications bus as it is preferred that the functionality is distributed among the interface units 40, 45, 50, 55, 60. Furthermore, the interface units can be merged into the logic of the subsystem or can be implemented as a separate block (40, 45, 50, 55, 60) coupled to bus.

In one embodiment, the communications bus 35 in FIG. 1 consists of the following wires: command/address lines 65, assert lines 70, clock lines 75, data/response lines 80 and flag lines 85. The system also includes token ring lines, e.g., lines 90, 95 for implementing a second level of arbitration as will be described below.

The address/command lines 65 are used to transmit the address that identifies the target subsystem. Preferably, the address lines further identify a resource within the target. Preferably, the specific allocation of lines between the address of a specific target subsystem and a resource within a subsystem can be varied and different for each target. Furthermore, it is preferred that the allocation is programmable. The assert line 70 is preferably a single line used by an initiator subsystem to indicate that it is going to use the packet preallocated to it to transmit a request. If the assert line is not active, then the initiator holding the token will gain access to that packet. The clock line 75 carries the clock from which the subsystems synchronize operation across the bus. The data/response lines 80 are used to transmit data and convey addressed target responses to requests. The flag lines 85 are general purpose lines available for specialized communication, thus adding further to the flexibility and robustness of the bus system. This particularly is advantageous to support communication that does not map easily into address/data transfers. For instance, as will be explained subsequently, these general purpose lines can be used to support handshaking signals between two subsystems or a communication originated by a subsystem that is not an initiator, such as an interrupt signal driven by a target subsystem to signal an initiator subsystem that data is available.

FIGS. 2a and 2b illustrate a simplified block diagram of the connections to one embodiment of an initiator interface module. The module contains logic and memory necessary to perform the functions described herein, including issuing requests (e.g., logic 250), interfacing to the client (clock/synchronizer 245), maintaining a configuration (configuration registers 240) and updating the configuration in accordance with commands received (e.g., logic 250). In order to receive commands to update the configuration of operation of the module, the initiator also functions as a target and therefore includes address/decode logic 242. For purposes of simplification of discussion, initiators are described as having embedded targets as their primary function is that of an initiator; however it maintains the functionality of the target as described herein. However flexibility is maintained as it is further contemplated that a subsystem may at different times function as a target or an initiator. The table of FIG. 2b summarizes the signals. In particular, "cycle" indicates the phase of the bus clock (sbclock) the signal is active. Since the bus is pipelined, multiple transactions can be simultaneously in progress. However, since it is preferred that all transaction have the same latency, each transaction precisely follows the same template. Cycle S0 is referred to herein as the arbitration cycle. Cycle S1 is referred to herein as the command/address cycle. Cycle SM, which occurs a predetermined number of cycles after S1, is the data/response cycle. Cycle SN is the error cycle.

Referring to FIG. 2a, the clock signal line sbclock 205, receives the bus clock. If the client operates synchronously to the bus or at some derived frequency, the clock circuitry 242 performs any clock division necessary to drive the interface to the client. The signals sbTokenIn (round robin token grant in) and sbTokenOut (round robin token grant out) 207, 209 are used in the second level of arbitration which is implemented in a token ring to indicate an incoming token and outgoing token, respectively. sbAssert 211 is asserted by owners of preallocated packet to state the intention to use the packet. The signal sbCmd 213 identifies the type of transaction as illustrated in FIG. 2c. The signal sbAddr 215 conveys the address of the target. All commands except the idle and broadcast command use this address mechanism. The sbWidth 217 signal indicates the data width, sbData 219, conveys data, sbResp 221 conveys response info such as that depicted in FIG. 2d. The sbFlagNum 223, as will be described later, identifies particular flags of sbFlag 225 for the receiver of the signal to monitor. The signals sbFlag 225 are configurable flag lines that can be used a variety of ways depending upon implementation.

The interface module which interfaces with a target client further contains target subsystem signal lines 230 to interface with a target client. The signals are discussed in FIG. 2e. These include the transaction type, exemplary types illustrated in FIG. 2f. In addition, the interface module which interfaces with an initiator client further contains initiator subsystem signal lines 235 as illustrated in FIG. 2g, including initiator client transaction types, such as those illustrated in FIG. 2h.

Communications are achieved by combining the following: framed operation, time-division multiplex access, synchronous operation, pipelined operation, fixed-latency operation, and split-transactions. In a time division multiplex access (TDMA) system, bus cycles are divided into frames. Device transfers between predetermined source and destination devices are pre-assigned frames. A synchronous system is one in which devices perform transfers based upon the same clock. In the present embodiment, a pipelined bus is a bus in which the address and command fields associated with a transaction are transmitted over the bus on a clock cycle before the data and response are transmitted allowing overlapping of the data/response of a first transaction with the address/command portion of a later transaction. In a fully pipelined bus, a new transaction can be initiated on every cycle of the clock. Thus, additional transactions can be initiated before completion of a prior transaction. Furthermore, in the present invention it has been determined that certain performance benefits can be achieved by fixing the latency between initiation of a transaction and completion of a transaction. Thus, in a fully pipelined, fixed latency, split transaction bus, the latency between a command and an associated data transfer is a known guaranteed value. This characteristic is extremely important for a bus that communicates with a processor or digital signal processing cores, which themselves operate in a fixed latency fully pipelined manner.

In prior art communication systems that are TDMA, the frames are typically allocated for prespecified point-to-point communications, such as point-to-point voice communications. Any changes to the point-to-point communications happens slowly and typically due to the changes in either end of the point-to-point communications link. The present invention overcomes these shortfalls by allocating only the right to initiate a transfer/operation command. This enables the initiator subsystem to easily communicate with a multiplicity of target subsystems on a real-time basis. The initiator subsystem issues requests that include address information identifying the address of the target subsystem; thus, the initiator can communicate during a frame with one or more target subsystems based upon the command and address used.

The communication system of the present invention provides a very high performance, low latency communication path between subsystems over a shared interconnect. In order to support the required system bandwidth, it may be necessary to operate the communication bus at a higher operating frequency than that of the individual subsystems. Differences between the bus frequency and the subsystem frequency can present significant challenges in the subsystem design, depending on the patterns of communication required by each subsystem. In particular, a single subsystem will likely be unable to keep up with a faster communications bus over long sequences of traffic to or from the subsystem; the problem is that the subsystem should not need to deal with data more rapidly than its own peak bandwidth requirements.

The system and method of the present invention further attempts to minimize usage of burst transfers. A burst is a sequence of data transfers occurring on consecutive bus cycles, typically involving implied address incrementation. Traditional computer busses emphasize such burst traffic as a way to improve performance by reducing the time inefficiencies resulting from bus arbitration and address transfers. The system cost implications of emphasizing burst transfers over a communications bus that operates at a higher frequency than the sending and receiving subsystems are that of expensive storage locations at the sender and receiver. The sender cannot initiate its transfer until it has buffered up a burst length's worth of data, and the receiver must provide a buffer into which to transfer the data. Furthermore, the very process of waiting for the last data to be created at the sender before transmitting the first data adds latency to the overall transfer.

It can therefore be seen that a better solution is one that allows data to be transferred at the natural operating rate of the sender or receiver. Thus, a time-interleaved set of individual transfers would replace a series of sequential burst transfers. This approach reduces storage and improves efficiency at both ends of the transfer. In addition, an appropriately configured time-interleaving scheme can deliver seamless integration of traditional computing traffic with demanding multimedia and communications traffic characterized by hard real-time deadlines. Delivering all of these features requires enhancements to the fundamental arbitration scheme of the communication bus.

Figure 3A:
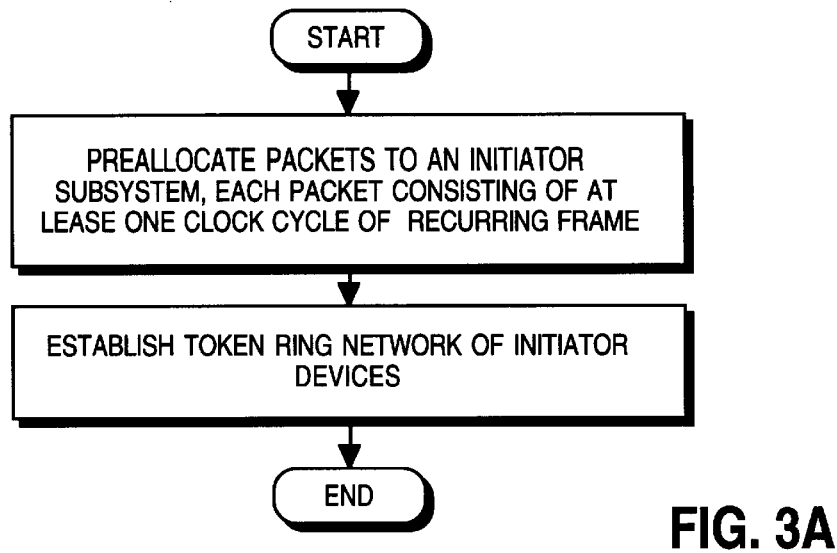
FIG. 3a is a simplified flow diagram of one embodiment of the process for setting up arbitration for access to the bus.

In one embodiment of the system of the present invention, a two level arbitration is used. This generally is described with reference to FIGS. 3a and 3b. Referring to FIG. 3a, the bandwidth allocation is performed. The allocation can be performed at initialization of the system. Furthermore, as noted herein, reallocation can be performed dynamically during operation by updating the configuration registers of the subsystems using available write bus transactions. To establish the bandwidth allocation, at step 302, the packets are preallocated to the different initiator subsystems. Depending upon the initiator subsystems coupled to the bus system and the needs of the initiator subsystems, varying numbers of packets may be allocated to different initiator subsystems. For example, one initiator subsystem may have high bandwidth requirements and is preallocated a large percentage of the available packets. Another initiator subsystem may be preallocated a small percentage of available packets, while still another initiator subsystem may not be preallocated any packets. Furthermore, it may be decided to not preallocate some packets such that there are always packets available for round robin arbitration.

At step 304, the token ring network is established to implement a second level of arbitration, for example a round robin arbitration. Typically the members to the token ring may be initiator subsystems that were not preallocated packets; however, initiator subsystems that have been preallocated packets may also be members of the token ring network.

Figure 3B:
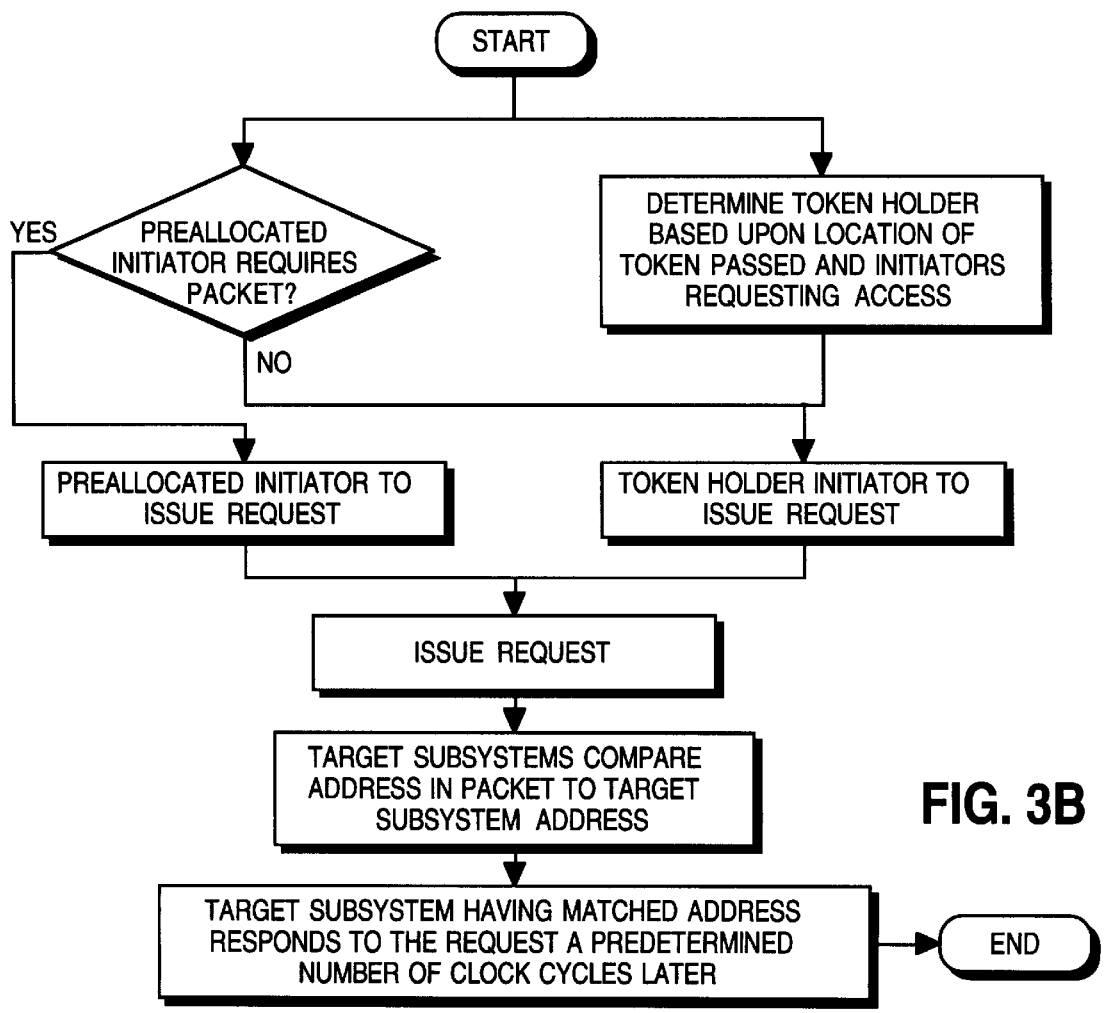
FIG. 3b describes one embodiment of the process for issuing requests and replying to requests.

Once the two levels of arbitration have been established, the bus system can begin operation. Referring to FIG. 3b, at step 306, it is determined whether the initiator preallocated a particular upcoming packet is going to use the packet. For example, this can be determined by monitoring a particular bus line, such as the assert line of the present embodiment. If asserted, the initiator preallocated the packet has access to perform a transaction, step 308 and a request is issued, step 310. If the initiator does not require access, then the packet is available for a second level of arbitration, which is performed via the token ring network. Preferably, as shown in FIG. 3b, the second level of arbitration (step 312, 314) is performed concurrently with the first level of arbitration (i.e., steps 306, 308) such that the token bearing initiator issues a request immediately after the preallocated initiator declines access. However, it is contemplated that the arbitration processes may also be implemented in a sequential manner.

Referring again to FIG. 3b, at step 312, if the current holder of the token requires the packet, the token bearing initiator maintains the token and is granted access, at step 314, if the preallocated initiator declines access. Otherwise, the token is passed to the next initiator subsystem in the ring to permit the next initiator to gain access. This process continues until the token is located at an initiator that requires access. In the present embodiment, if the receiver of the token is again the initial holder of the token indicating therefore the token was passed around the ring without an initiator subsystem requiring access, the initial holder will maintain the token, and if granted access at step 314, will issue a dummy request to enable the arbitration to be completed.

The request issued by an initiator subsystem contains an address of the intended target. Preferably, the request further contains an address of a particular resource in the target. The target subsystems monitor each request issued to determine whether the address corresponds to the address of the target, step 322, and if a correspondence (e.g., a match) is determined, the target subsystem responds to the request a predetermined number of clock cycles later, step 324. For example, if the request is a write operation, the target subsystem receives the data and issues a completion response the predetermined number of clock cycles after the issuance of the request. If the request is a read operation, the target subsystem provides the read data the predetermined number of clock cycles after the issuance of the request. In one embodiment, a 1:1 match between the issued address and target address is contemplated. However, various levels of correspondence, such as comparisons performed in conjunction with masks to match one or more devices are also contemplated.

As noted above, when a packet bus cycle is allocated to a subsystem, this subsystem has the right to issue a request during the slots associated with that bus cycle. This allows a pre-allocation of the bandwidth to the different subsystems. The advantages of a TDMA are guaranteed and predictable bandwidth, since the bus cycles are pre-allocated to the different subsystems in advance. This feature is critical in supporting clients with fixed real time bandwidth requirements. The combination of these two concepts, time division multiplex access and fixed-latency pipelined transactions, provides for a very high-performance communications protocol that guarantees both latency and bandwidth.

As briefly described above, the first level of arbitration is implemented in the following way. In one embodiment, the total available number of bus cycles are divided up into recurring frames. For purposes of discussion, the frame is divided up in a number of packets, which corresponds to a number of cycles. For example, a 256 cycle frame is divided up in 128 2-cycle packets. Thus, a frame could be composed of 128 2-cycle packets, and in such a design the frame would repeat every 256 bus cycles. The first level arbitration scheme revolves around the allocation of these packets to the different subsystems. Since only initiator subsystems can issue commands, the packets should only be allocated to the initiator subsystems.

In the present embodiment, every initiator subsystem contains a synchronous counter, which runs in lock step with all other counters. The output of this counter is used to index a programmable logic circuit whose output determines if the packet associated with the output of the current counter value is allocated to this particular interface module. By implementing a counter in each initiator interface module and maintaining the counters in lock step, the system implements a fully distributed TDMA time wheel, preferably as long as no two initiator interface modules are allocated the same packet. The programmable logic circuits in the interface modules are pre-programmed at system initialization with information regarding allocation and/or may be re-programmed during run-time of the system by commands issued over the communications bus to the different initiator subsystems. This allows for dynamic re-allocation of the bandwidth in the system.

The allocation of the packet occurs preferably during a bus cycle before the occurrence of the packet; for example, the bus cycle immediately prior to the occurrence of the packet. Although a variety of implementations may be used, the most versatile implementation of the programmable logic circuit is as a look-up table in the form of a small random access memory (RAM). The depth of such a RAM is equal to the number of packets in the frame. Thus, the TDMA time wheel is implemented simply by indexing into the RAM with the frame counter. Preferably, the RAM where the tables are stored are user-visible and accessible for reading and writing over the communication bus by software using the same read/write commands as used in standard data transactions. This allows the bandwidth allocation of the system to be changed at transaction speeds comparable to normal read/write transactions over the bus, and to change the allocation to unevenly distribute bandwidth as needed to support certain applications.

In certain situations, subsystems may not use one or more of the pre-allocated cycles. This may occur as although some system traffic is predictable, even the predictable traffic may not be uniform. For instance, frame buffer traffic transferred to a display is very predictable, but the traffic flow is interrupted while the display performs horizontal and vertical retrace operations. Furthermore, some initiator subsystems may have very low performance requirements, and pre-allocating any bandwidth to such a subsystem may lead to a lot of unusable cycles. Therefore, it is desirable to enhance the time-division multiplexed access protocol with the second level of arbitration.

At the second level of arbitration, packets that are not pre-allocated or packets that were pre-allocated but not used are contended for by the other initiator subsystems on the bus in a fair round-robin scheme using a token passing mechanism. This second level of arbitration ensures that no packet remains unused if any subsystem in the system can use the bus. The mechanism of the second level of arbitration retains all the advantages of the previously described communications method, but increases the overall efficiency of use of the available system bandwidth.

In the present embodiment, the second level of arbitration is implemented as a fair round-robin scheme using a token passing mechanism. All initiators that participate in the second level of arbitration are connected in a ring to pass the token around. Typically, those initiators that can tolerate an unpredictable latency participate in the second level of arbitration. In addition, it is contemplated that subsystems that participate in the first level of arbitration can also participate in the second level of arbitration. A token is allocated to one initiator subsystem at initialization. The token signifies a conditional right to issue bus commands during the bus cycles associated with the current packet. This right is conditional because it is dependent on the pre-allocated owner of the packet not asserting its right to use the packet or on the packet being un-allocated. When a packet remains un-allocated after the above-described first level of arbitration, the packet is arbitrated for using the second level of arbitration. Thus, the TDMA scheme actually allocates a right of first refusal: the pre-allocated owner must assert its right to use its packet, or else the packet is made available to the initiator that ends up with the token.

On every arbitration cycle (i.e. every packet), the token may remain at the initiator that held it on the previous cycle, or it may pass around the ring to the next initiator that is requesting the token, unlike existing token ring systems, in one embodiment of the present invention the token may be passed completely around the ring back to the initiator that started it. The token's action depends upon system conditions and fairness constraints as set forth in the system's rules. For example, it is unfair for one initiator to use the token for more than one packet, since other initiator subsystems may be waiting. It is equally unfair for an initiator subsystem to be forced to give up the token before having a chance to use it. Thus, in one embodiment, the token-passing rules are structured such that an initiator subsystem that requests and receives the token may keep it until getting an opportunity to initiate precisely one packet's worth of commands across the communication bus. That opportunity may occur in the arbitration cycle in which the token arrives, or it may not occur for a large number of cycles, depending on the usage decisions made by the devices to which the packets are pre-allocated to owners. Finally, once the initiator with the token has a chance to use it, the initiator starts the token around the ring by driving its TokenOut signal to logic one. If no other initiator requests the token, it will pass completely around the ring and return to its sender.

In order to prevent the token from circulating around the ring indefinitely, it is preferred that the initiator subsystem that starts the token must temporarily break the ring. Thus, the initiator subsystem that starts the token on any given arbitration cycle can end up with it again by the end of that arbitration cycle. It should be noted that it is desirable that the communication bus signals always be actively driven so that the wires do not float to an undetermined state where improper bus operation and increased power dissipation may occur. As such, the initiator that ends up with the token should initiate a bus command whenever no pre-allocated packet owner asserts its right of first refusal. In such a case, the initiator with the token should initiate a useless command (a harmless read or write, or a NOP/Idle command) if it has no useful commands to issue.

If the initiator that owns the token at the beginning of the arbitration cycle has not had an opportunity to use the token and has commands to issue, it can keep the token. If not, the initiator pulls a signal wire high (e.g., Token Out) indicating to other initiator subsystems that the token is available for the contention through the second level of arbitration. The initiator subsystem that has the token (i.e. the initiator subsystem that used the token last) passes the token on to the next initiator subsystem in the ring, which then, in turn, can appropriate the token if it can use the cycle. If not, the token is passed around until the token is allocated, in which case that specific initiator subsystem keeps the token as a starting point for the next token ring arbitration. If no initiator subsystem uses the token, it comes back to the initiator that initially had the token. All packet arbitration, both the first level and second level, occurs in the same cycle. This second level of arbitration does not provide guaranteed bandwidth, but does provide for guaranteed access. Using the second level of arbitration, no initiator system can command the bus for more than 1 packet if another initiator also wants access to the bus.

Figure 4A:
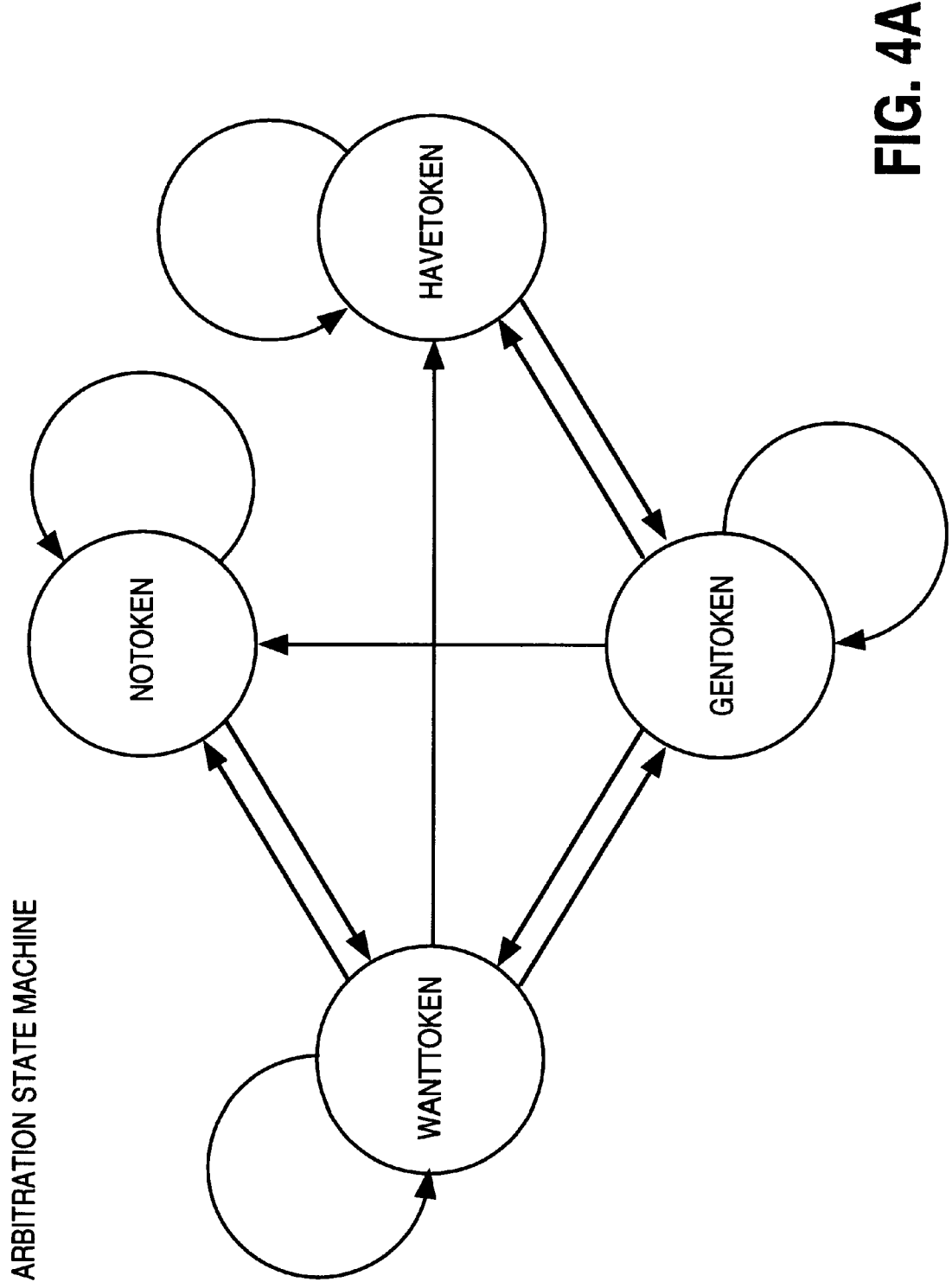

FIG. 4a illustrates the states of one embodiment of the second level of arbitration and the table of FIG. 4b sets forth a brief explanation of the states. In this embodiment the propagation delay around the ring is minimized by two implementation aspects. First, the interface module generating the token does so purely as a function of the current state. Furthermore, the interface modules along the way decide to pass the token or not purely as a function of the current state. These two features get the token into the ring as quickly as possible and prevent any delay-inducing uncertainty in how long the token will need to propagate through an intermediate interface module.

The input to the states are ReqToken, Tokenin, Assert, Reset_n, First and the outputs are TokenOut, Grant Token and the next state. ReqToken indicates that the interface is requesting the token, TokenIn indicates that the token is available to this initiator, Assert is used to indicate that the preallocated initiator will use its packet, reset_n is used to force the system into a reset state, TokenOut is used to pass the token to the next initiator in the ring, GrantToken is used to tell the initiator that it should prepare to issue a request and Next State indicates the next state of the particular interface module of the initiator subsystem.

In state NOTOKEN, the interface module of the subsystem neither desires nor has the token. Thus, if the token arrives on TokenIn it is immediately passed on via TokenOut. The state machine leaves NOTOKEN once it samples the interface module requesting the token. In state WANT TOKEN, the interface module does not have, but desires, the token. It therefore breaks the ring, such that when the token arrives on TokenIn this module will grab it. Once the token arrives, the interface module will use it (by noticing GrantToken) if no pre-allocated slot owner drove Assert. If Assert is active, then the module will keep the token until it gets an opportunity to us it, so the state machine transitions to HAVETOKEN.

In state HAVETOKEN, the module has the token and is waiting for an opportunity to use it. As soon as no module raises Assert, the slot is available and this module will use it (by noticing GrantToken). When either this occurs or the interface module stops asserting ReqToken (presumably because its request was satisfied via a pre-allocated slot), the state machine transitions to GENTOKEN. Since this module has the token, there is no need to pay attention to the TokenIn line (e.g., it must be zero). In state GENTOKEN, the module will start the token around the ring at the beginning of the arbitration cycle. The module must break the ring in case no module is in WANTTOKEN (i.e., is actively requesting the token). If the token makes it all the way around the ring back to this module, the interface module will receive GrantToken and be required to initiate a command, independently of whether the device requested the token.

While the state machine is in reset (Reset_n is driven low), the starting state is set to NOTOKEN for all interface modules except the one labeled First. The First device is unique in that it starts off with the token at reset, thus ensuring that there is precisely one token in the ring at any time. Furthermore, it should be noted that in the present embodiment, the Don't Care entries in the ReqToken column (other than during reset) guarantee that precisely one device always initiates a command. The interface module that ends up with the token at the end of arbitration must initiate a command if no pre-allocated slot owner drives the Assert line high.

Using the above described allocation methodology, a variety of clients having varying requirements can be supported. The same system can be programmed to meet particular client needs; thus, the proper portion of preallocated clients and packets can be programmed according to system needs.

The minimum set of commands that are issued over the bus are a read command and a write command. The communications method can naturally be extended to support other commands, including specially designed control commands to control the subsystems coupled to the bus. FIG. 5 shows a timing diagram of exemplary transactions across such a fully pipelined, fixed-latency bus that operates in accordance with the teachings of the present invention. Every transaction consists of an arbitration part, a command/address part, and a data/response part. Since the bus is a fixed-latency bus, there is a fixed delay (in number of clock cycles) between the two transactions, i.e., request and response. In FIG. 5, the latency between arbitration and command/address is one cycle, the latency between command/address and data is assumed to be 2 two cycles, and a packet (the arbitration unit) is one bus cycle. In cycle 1, initiator subsystem I-D asserts its right to use its preallocated packet, so in cycle time slot 2, I-D issues a command and address on the bus to a target. For explanation purposes, the command is labeled Command 1. All target interface modules contain address decoding logic to decide if a transaction is addressed to their client subsystem. In time slot 4, the addressed target interface module responds to the request command. In case of a read request command, the read data is sent from the target to the initiator. In case of a write request command, the data to be written is sent from the initiator to the target in cycle 4.

A response signal that is driven by the target in cycle 4 from the target over the data response lines indicates if the transaction was successful or not. In the one embodiment, there are 4 possible responses: "Valid", "Busy", "Retry" and "No Response". The "Valid" response indicates that the transaction was successful. The "Busy" response indicates that the target module could respond to the command. The "Retry" response is only allowed for read commands, and indicates that the target is attempting to satisfy the command but could not do so within the fixed bus latency. The initiator must retry its request later. In case of a "No Response", the address provided with the command did not match any of the targets, and therefore no target responded.

Continuing to reference FIG. 5, a second arbitration cycle begins in clock cycle 2 and another transaction is issued in cycle 3. In this situation, no pre-allocated initiator asserted its right to use the bus cycle, so initiator subsystem I-E, which ended up with the token in cycle 2, issues a command and address in cycle 3. The data and response signals associated with this the command are issued transfer in cycle 5, a bus cycle latency later.

As noted earlier, the interface modules preferably are programmable to provide for dynamic reallocation of the packets. In one embodiment, the interface modules for each subsystem contain a set of configuration registers (240, FIG. 2) to store the configuration data of the modules and the bus.

Preferably, the configuration registers store data identifying packets preallocated to the corresponding subsystem. The configuration registers have addresses in the system address space, and therefore can be read from and written to using available bus transactions. Preferably, there are 2 sets of configuration registers, buffered and unbuffered configuration registers. Data written to an unbuffered register is visible to the interface module and to the rest of the system immediately after a write operation to the register. Data written to a buffered register is stored in a holding register location and only becomes visible after that data has been transferred from the holding register to the configuration register. The transfer is initiated through a broadcast command over the bus. A broadcast command is a command that affects all interface modules simultaneously. Thus, buffered registers typically are used when it is desirable to update several interface modules simultaneously before the new data can be allowed to be seen by the rest of the system.

One example of the use of buffered registers is the assignment of the address map in the system. Each target interface or module has a locally stored mask and match data value that specifies to which address(es) the target will respond. The address on the and the result is mthe match field and the result is masked. If all bits in the masked result are 0, this specific interface module is addressed. The mask/match data is stored in a configuration register and can be written to by regular bus commands. Proper operation of the system requires that target address ranges must be uniquely assigned in the system. If address changes are to be implemented, for example, the swapping of addresses, the new assignments should take place simultaneously in all affected interface modules. Otherwise, overlapping address-spaces may exist during the transition from one address map to the other.

As noted earlier, this invention is not limited to the use of buffered and unbuffered configuration registers. Furthermore, in systems where some or none of the data in the configuration registers needs to change during the lifetime of the system, all or some of the data can be stored in read only memory (ROM). ROM typically requires less die area, and prevents undesired writes to configuration locations that resulted in improper system configuration. Preferably, a typical system contains interface modules having a combination of buffered configuration registers, unbuffered configuration registers, and ROM. Information included in the configuration registers consists of data regarding packets preallocated to initiator subsystem, latency, frequency of communication between interface module and the coupled address device of the target for purposes of request address matching.

An important feature of the above is the fact that configuration data can be written during real-time operation of the system using available normal read and write commands as the registers are part of the system address space. This allows the system designer to change many significant features of the communication system via simple software or even pre-computed command sequences stored in a ROM.

One important and unique enhancement in the present invention over the prior art is the fact that the bus latency is programmable at initialization of the system or during the run-time of the system. In the preferred embodiment, the latency is programmable over the communications bus. Because of the fully pipelined nature of the communication bus, such an operation requires a broadcast command so the pipeline depth is changed simultaneously in all interface modules. When low-latency responses are important to the system (such as access to memory), a low latency can be programmed into the communications system by writing the new latency into the appropriate configuration registers of the interface modules. On the other hand, when most of the critical communications over the bus is between long-latency subsystems (systems that can not respond very quickly), the system latency can be set higher. The fact that the latency can be programmed at speeds comparable to regular bus transactions is a significant improvement over the prior art.

Not only can the latency be changed, but also the bandwidth allocation can be changed using the same method of updating the appropriate configuration registers. The fact that the bandwidth allocation can be programmed at speeds comparable to a normal read or write transaction over the communications bus, either at initialization or during the run-time of the system is a significant improvement over prior art.

The combination of programmable bandwidth allocation and programmable bus latency provides distinct advantages; most particularly, the system designer can optimize the performance of the system for the particular configuration of initiators and targets. Furthermore, the optimization can be maintained through a variety of conditions and configurations as the bandwidth allocation and latency can be updated during operation. Furthermore, as will be described subsequently, additional flexibility and configurability is contemplated by enabling an initiator device to program the frequency at which a target and its interface module communicate. This is particularly desirable to adapt to varying subsystem timing requirements of the initiator and/or target client.

Preferably, the bus functionability further is enhanced by adding a set of system-level control wires (referred to in FIG. 1 as flags) that manage out-of-band communication. Out-of-band signals are signals that do not follow the address/data-oriented pipelined bus model. Examples include device status signals, interrupt, and handshake signals. In the preferred embodiment, these wires are also used for enhancing the performance of the basic read operations in the following manner.

For example, in the operation of the system as illustrated by FIG. 5, if the target subsystem can respond to a read request command in time to meet the bus latency requirement, a "Valid" response is transmitted over the response bus. In the case where the target subsystem cannot respond in time to meet the bus latency requirement, a "Retry" response is transmitted. Rather than requiring the initiator to estimate when the desired data is available, which results in additional wasted bus cycles or increased latency, the target interface module uses one of the out-of-band signals (referred to herein also as flags). The target interface module uses the flags to provide a precise indication back to the initiator once the target interface module has obtained the data.

Figure 6:
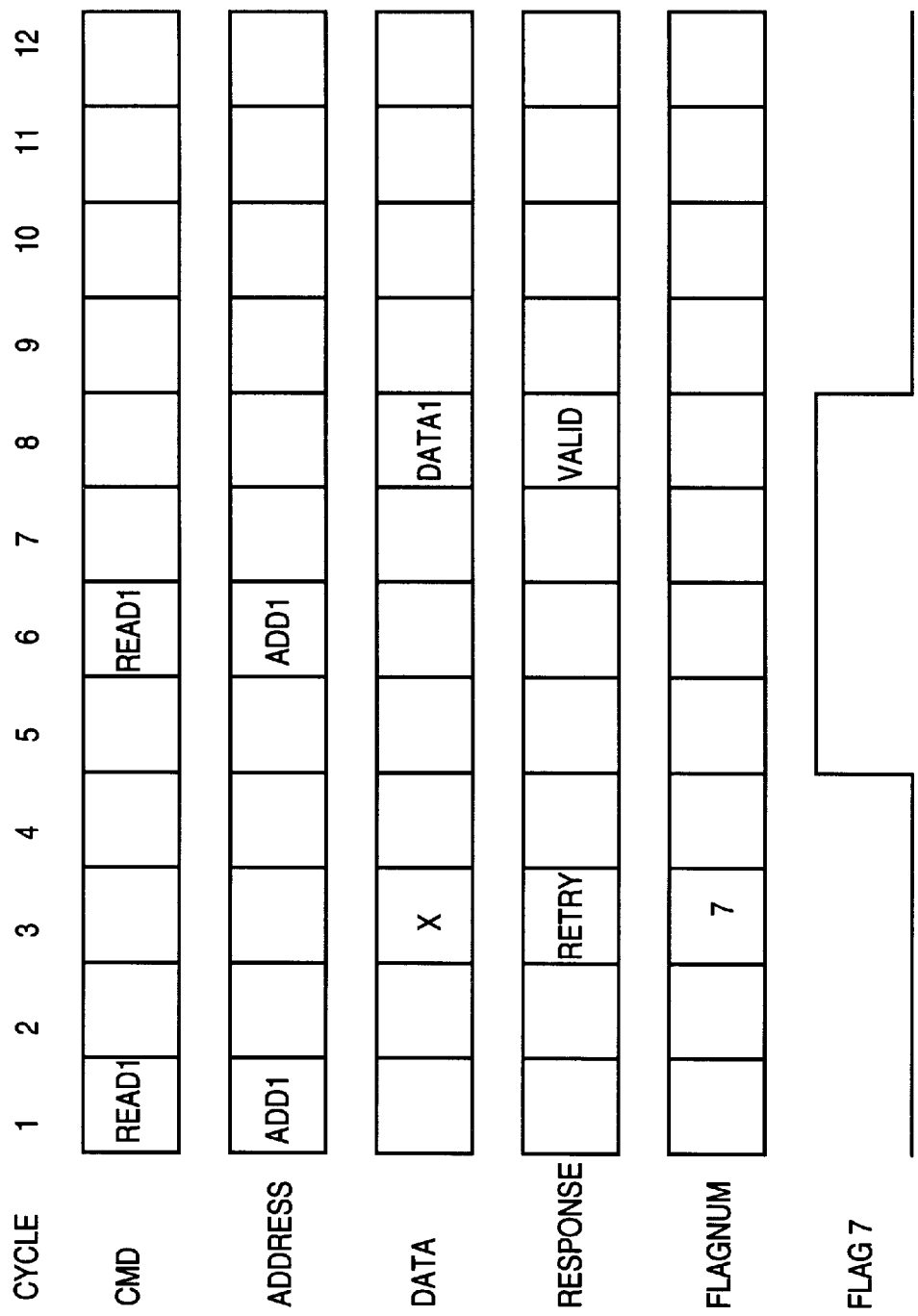
FIG. 6 illustrates a retry process in accordance with the teachings of the present invention.

FIG. 6 illustrates the retry mechanism using the out of band signal lines. When a client cannot meet the latency of the communications bus, the target interface module issues a response packet to the initiator to indicate a "Retry". In the same time slot the bit number of a Flag wire signal is transmitted on the FlagNum lines (which are, for purposes of simplification, part of the Flag lines of FIG. 1). This indicates to the initiator subsystem that it should monitor that identified flag for an indication of when to retry.

In the example of FIG. 6, a Read request command is transmitted in cycle 1. The bus latency is two cycles, so the data should be returned by the target interface module in cycle 3. However, the data is not available yet, so the target returns a retry response on the response wires and it returns the number of a flag wire on the FlagNum bus, in this example number 7. When the target interface module receives the data from its client (i.e., coupled device), it stores the data in local memory and it drives the indicated flag wire high, indicating to the initiator that the data is now available. In FIG. 6, after cycle 4, the target indicates on Flag 7 that the data is available. At this time, the initiator subsystem can now re-issue the request command which in FIG. 3 occurs on cycle 6. When the target interface module satisfies the request command (cycle 8 in FIG. 3), it deasserts the Flag that has been associated with this request command.

The communications system preferably contains a number of flags that are allocated to the different target interface modules. Flag wires can be shared between modules or can be dedicated to a specific module. In the preferred embodiment, the allocation of the flags is stored in the configuration registers and therefore this allocation is programmable over the communications bus and at a speed comparable to normal bus transactions.

The flag wires can be used for a variety of purposes. For example, a different use of the flag wires is the management of handshake signals and interrupt signals. These are signals that indicate a special event in the interface modules or the subsystem. Examples of such signals are error signals or signals that indicate busy status (stop sending requests) or ready status (subsystem is ready to take accept requests). These signals are inherently out of band signals and are transferred using the flag wires. For these purposes, the flag wires is are uniquely allocated to target interface modules and their subsystem clients for the specific purpose of interrupt or handshake signaling. In the preferred embodiment, this data allocation is stored in a configuration registers so it may be dynamically varied as system needs change. The same information is programmed in the initiator subsystem to let the initiator know the flag wires to monitor for handshake or interrupt purpose.

As noted above, the interface modules between the bus and the subsystems contain logic to implement the bus protocols while interfacing with the client. Furthermore, it is preferred that the interface contains additional logic (245, FIG. 2) to derive a client clock of the subsystem from the system bus clock. The interface module through the configuration registers provides a level of programmability to enable subsystems reuse in many different systems with very different system features and performance requirements. The frequency of the system bus clock is determined by system requirements, most notably the total bandwidth required on the bus to satisfy the required performance of the system. The client clock frequency of a client can be independent of the system bus clock, and should be related to the functionality required of the client. The interface modules therefore provide a powerful means of decoupling the system and subsystem requirements.

In a traditional fixed-latency bus system, increasing the available bandwidth requires increasing the operating frequency of the bus and all of its clients, since the clients would need to respond in less time to meet the latency. With the system of the present invention, the bus latency (measured in cycles) can be increased as the bus frequency is increased, which tends to allow clients to operate a approximately consistent frequencies, since the total latency (in time) stays relatively constant. It is contemplated that the decoupling feature be extended to asynchronous connections between the interface module and the client.

The requirement for frequency decoupling is primarily based on the rich variety of systems that can benefit from this approach. One example system is a wireless personal communicator, which requires fixed-performance real-time subsystems (to implement the wireless communications) along with low-performance, computer-derived subsystems such as a microcontroller core, embedded memory, keypad input and liquid crystal display (LCD) output. Key design goals for the communicator are to provide reliable communications and as many features as possible (implemented in software on the microcontroller) at low power. A second exemplary system is a set-top box for receiving digital satellite television broadcasts. The set-top box design requires much higher bit-rate data communications and higher computational performance to decompress the video and audio data, and must guarantee performance across the entire system to avoid dropping frames. A third example is an Asynchronous Transfer Mode (ATM) switch. The switch design likely needs a central processing unit (CPU) only to monitor performance and provide diagnostics; the normal operation would involve switching packets between identical subsystems across the shared interconnect. As in most circuit switching applications, performance guarantees are critical to proper operation of the ATM switch.

The opportunities presented by design re-use for a variety of systems are now illustrated. A wireless system for video-on-demand could combine the two-way wireless subsystems from the personal communicator, the ATM packet framing engine from the ATM switch, and the video decompression subsystems from the set-top box. Combination of subsystems that were never intended to interoperate into rapidly integrated, cost-effective systems can be achieved.

The invention has been described in conjunction with the preferred embodiment. It is evident that numerous alternatives, modifications, variations and uses will be apparent to those skilled in the art in light of the foregoing description.

What is claimed is:

1. A computer bus system comprising:
    a synchronous bus operative during a number of bus cycles, said number of bus cycles divided into recurring frames, each frame further divided into packets comprising at least one clock cycle;
    at least one initiator subsystem coupled to the bus, the at least one initiator subsystem configured to have at least one packet preallocated to the at least one initiator subsystem, said initiator subsystem configured to send out a request during a clock cycle within the at least one preallocated packet, said request comprising a command and further comprising an address of a target subsystem;
    at least one target subsystem, said target subsystem configured to receive the address of the request and determine if the address corresponds to an address of the target subsystem, wherein if the address of the request corresponds to an address of the target subsystem, said target subsystem responds to the request on a second clock cycle.

2. The computer bus system as defined in claim 1, wherein the at least one initiator subsystem comprises at least two initiator subsystems, wherein each of the at least two initiator subsystems has at least one packet pre-allocated to it.

3. The computer bus system as defined in claim 1, wherein every pre-allocated packet is allocated to at most one initiator subsystem.

4. The computer bus system as defined in claim 1, wherein the at least one initiator subsystem signals its intention to use the at least one preallocated packet during a clock cycle preceding the clock cycle within the at least one preallocated packet.

5. The computer bus system as defined in claim 4, wherein when a packet is pre-allocated to an initiator subsystem but not used by said initiator subsystem or when a packet is not pre-allocated, any initiator subsystem may arbitrate for access to the packet.

6. The computer bus system as defined in claim 1, wherein said initiator subsystem comprises an addressable memory configured to store configuration data, said configuration data controlling said pre-allocation of packets, and wherein said addressable memory is accessed over the bus.

7. The computer bus system as defined in claim 1, wherein said pre-allocation of packets to said initiator subsystem is programmable concurrently with normal bus operation at speeds comparable to speeds of normal transactions over the bus.

8. The computer bus system as defined in claim 1, wherein the bus includes a set of flag wires, each flag wire allocated to a transmitting subsystem, and said flag wires used for transmitting control information between said transmitting subsystem and at least one receiving subsystem, wherein the control information is not related to an address space of a subsystem or to pre-allocation of a packet.

9. The computer bus system as defined in claim 8, wherein each flag wire of the set of flag wires is associated with a flag number, and wherein the bus further comprises a set of flag number wires that transmit a flag number that indicates that at least one associated flag wire of the set of flag wires may be monitored for information.

10. The computer bus system as set forth in claim 9, wherein a flag number is used to inform an initiator subsystem that a target subsystem cannot respond to a request in time to meet a predetermined latency requirement.

11. The computer bus system as set forth in claim 10, wherein:
  when said target subsystem is able to respond, said target subsystem asserts a signal on said flag wire; and
  said initiator subsystem responds to the signal by re-issuing the request, wherein said target subsystem responds to the re-issued request and de-asserts the signal on said flag wire.

12. The computer bus system as set forth in claim 1, wherein the initiator subsystem and the target subsystem each comprise:
  a client; wherein the client includes a client clock configured to be synchronous with respect to a bus clock of the bus, wherein the client clock is derived from the bus clock and a ratio of the bus clock to the client clock is programmable; and
  an interface module coupled between the client and the bus.

13. The computer bus system as set forth in claim 1, wherein the initiator subsystem and the target subsystem each comprise:
  a client including a client clock, wherein a client clock frequency of the client clock is unrelated to an operating frequency of a bus clock of the bus; and
  an interface module coupled between the client and the bus comprising synchronization logic to synchronize the client clock to the bus clock.

14. The computer bus system as defined in claim 1, wherein said target subsystem responds to the request a predetermined number of clock cycles after said first clock cycle.

15. The computer bus system as defined in claim 14, wherein said predetermined number of clock cycles is programmable.

16. The computer bus system as defined in claim 15, wherein said predetermined number of clock cycles is programmable concurrently with normal bus operation at speeds comparable to speeds of normal transactions over the bus.

17. A method for transmitting data between subsystems over a bus, comprising the steps of:
  an initiator sending a request on a first clock cycle, said request comprising at least a command and a target address, said first cycle being part of a packet that is pre-allocated to the initiator, said packet comprising at least one clock-cycle, a plurality of packets comprising a recurring frame;
  at least one target receiving said request; and
  if a target of the at least one targets has an address corresponding to the target address, the target responding to said request on a second clock cycle.

18. The method of claim 17, further comprising the step of, when a packet is pre-allocated to an initiator and is not used by the initiator, executing a second level of arbitration wherein said packet is allocated to another initiator.

19. The method as defined in claim 17, further comprising the step of, when a clock cycle is not pre-allocated to any initiator, executing a second level of arbitration wherein said clock cycle is allocated to an initiator.

20. The method as defined in claim 17, further comprising the step of, when a clock cycle is not used by an initiator to which said clock cycle was preallocated, executing a second level of arbitration wherein said clock cycle is allocated to an initiator.

21. In a computer bus system comprising a bus coupling at least two subsystems, wherein each subsystem comprises at least one of an initiator and a target, a method for changing parameters, the method comprising the steps of:
  defining, in each subsystem, a first addressable memory;
  defining, in each subsystem, a second memory containing configuration data used by said subsystem;
  an initiator issuing write commands over the bus addressed to said first memory in said subsystems;
  said initiator issuing a single command to all subsystems;
  in response to said single command, writing new configuration data based upon contents of said first memory to said second memory of each subsystem; and
  each subsystem using said new configuration data for reconfiguration.

22. The method as defined in claim 21, wherein writing new configuration data comprises copying the contents of the first memory to the second memory.

23. In a single chip computer bus system comprising a bus coupling at least one initiator client and at least one target client, a method for communication across the bus comprising steps of:
  pre-allocating at least one packet to said initiator client, the at least one packet determined by dividing bus cycles of the bus into recurring frames, wherein each frame is divided into packets each comprising at least one clock cycle;
  the initiator client sending out a request on a first clock cycle, said first clock cycle being part of a packet that is pre-allocated to said initiator client and said request comprising at least a command field and an address field, said address field identifying a target client;

the target client receiving an address in the address field; and if an address of the target client corresponds to the address in the address field, said target client responding to said request in a second clock cycle.

24. The method as defined in claim 23, wherein said second clock cycle occurs a predetermined number of clock cycles after said first clock cycle.

25. A communication system comprising:

a communication medium that transmits data during communication cycles, wherein a communication cycle comprises a plurality of recurring frames, and wherein each recurring frame is further divided into a plurality of packets, and each packet comprises at least one clock cycle;

at least one initiator subsystem coupled to the communication medium, wherein at least one packet is preallocated to the at least one initiator subsystem, and wherein the at least one initiator subsystem transmits a request during a clock cycle within the at least one preallocated packet, wherein the request comprises a command and an address of a target subsystem;

at least one target subsystem, wherein the at least one target subsystem receives the address of the request and determines if the address corresponds to an address of the target subsystem, therein if the address of the request corresponds to an address of the target subsystem, the target subsystem responds to the request on a second clock cycle.

26. The communication system of claim 25, wherein the second clock cycle occurs a predetermined number of clock cycles after the first clock cycle.

27. The communication system of claim 26, wherein when the at least one initiator subsystem does not use the at least one preallocated packet, the at least one initiator subsystem may arbitrate for access to a packet.

28. The communication system of claim 27, wherein arbitration is according to a round robin scheme.

29. The communication system of claim 28, further comprising a token ring, wherein arbitration comprises token passing in the token ring.

30. The communication system of claim 29, wherein, when the at least one initiator subsystem does not use the at least one preallocated packet, an initiator subsystem that holds a token may access a packet for transmitting a request.

31. The communication system of claim 30, further comprising a state machine that includes combinational logic for determining a current holder of the token and a next holder of the token, wherein a token may pass from a position of the current holder through several positions in a single clock before reaching a position of the next holder of the token.

32. The communication system of claim 27, wherein arbitration is according to a fair arbitration scheme.

33. The communication system of claim 26, wherein when no packet is preallocated to an initiator subsystem, the at least one initiator subsystem may arbitrate for access to the packet.

34. In a communication system that includes multiple initiator subsystems and multiple target subsystems, wherein the initiator subsystems and the target subsystems each occupy a position in the communication system, a method for transmitting information between the multiple initiator subsystems and the multiple target subsystems, the method comprising the steps of:

transmitting information in the communication system in packets;

pre-allocating a packet to an initiator subsystem of the multiple initiator subsystems; and the initiator subsystem issuing a request for an operation using the preallocated packet, wherein a request comprises a command and an address of a target subsystem of the multiple target subsystems.

35. The method of claim 34, further comprising the step of:

passing a token between the multiple initiator subsystem; and when the preallocated packet is not used by the initiator subsystem, an initiator subsystem holding the token issuing a request for an operation using a packet.

36. The method of claim 35, wherein passing the token comprises determining:

an initiator subsystem of the multiple initiator subsystems that has the token;

at least one initiator subsystem of the multiple initiator subsystems that does not have the token and wants the token; and at least one initiator subsystem of the multiple initiator subsystems that does not have the token and does not want the token.

37. The method of claim 36, wherein determining comprises using a state machine that includes combinational logic, and wherein passing the token comprises passing the token from a position of the initiator subsystem that has the token through multiple positions of initiator subsystems that do not have the token and do not want the token to a position of an initiator subsystem that does not have the token and wants the token.

38. The method of claim 37, further comprising the step of:

comparing the address with an identifier of a target subsystem; and if the address corresponds to the identifier of the target subsystem, the target subsystem responding to the request.

* * * * *